US006041976A

United States Patent [19]

Robertson

[11] Patent Number: 6,041,976

[45] Date of Patent: Mar. 28, 2000

[54] ADHESIVE DISPENSING TOOL FOR USE WITH A ROTARY POWER TOOL

[76] Inventor: Roger C. Robertson, 610 Pope St., Rockford, Ill. 61104

[21] Appl. No.: 09/078,974

[22] Filed: May 14, 1998

[51] Int. Cl.[7] .............................. G01F 11/30; B67D 5/64

[52] U.S. Cl. ........................ 222/333; 222/390; 222/611.1

[58] Field of Search ................................ 222/174, 611.1, 222/333, 390, 327, 626

[56] References Cited

U.S. PATENT DOCUMENTS

| | | | |
|---|---|---|---|
| 3,208,638 | 9/1965 | Frenzel et al. | 222/39 |
| 3,273,763 | 9/1966 | Gilmont | 222/390 |
| 3,854,629 | 12/1974 | Blieberger | 222/109 |
| 3,913,799 | 10/1975 | Davis, Jr. | 222/333 |
| 3,997,084 | 12/1976 | Davis, Jr. | 222/326 |
| 4,258,866 | 3/1981 | Bergman | 222/333 |
| 4,260,076 | 4/1981 | Bergman | 222/46 |
| 4,306,671 | 12/1981 | Fisher | 222/333 |
| 4,322,022 | 3/1982 | Bergman | 222/327 |
| 4,886,188 | 12/1989 | Falco | 222/333 |
| 4,932,565 | 6/1990 | Paradiso | 222/174 |
| 5,027,984 | 7/1991 | Gakhar et al. | 222/333 |
| 5,228,605 | 7/1993 | Schlichenmaier | 222/611.1 |
| 5,538,161 | 7/1996 | Koehler et al. | 222/46 |
| 5,839,612 | 11/1998 | Burke | 222/390 |

OTHER PUBLICATIONS

Advertisement, Milwaukee Tools.

*Primary Examiner*—Gregory L. Huson
*Assistant Examiner*—Keats Quinalty
*Attorney, Agent, or Firm*—Leydig, Voit & Mayer

[57] ABSTRACT

A caulking gun or adhesive dispensing tool is driven by an expandable drive mechanism. The drive mechanism comprises a threaded shaft interfitting with the threaded inner surface of a receiving sleeve. The sleeve carries a pusher plate into a caulk receptacle for engaging a tube of adhesive material. The shaft is attachable to the chuck of a common drill. Rotation of the shaft linearly translates the sleeve and hence the pusher plate into the caulk receptacle. A drive housing interposed between a drill and the caulk receptacle generally houses the drive mechanism and extends the length of the adhesive dispensing tool to provide for easier manipulation thereof. The adhesive dispensing tool may include a handle and a pair of wheels for easier manipulation of the tool.

20 Claims, 2 Drawing Sheets

ADHESIVE DISPENSING TOOL FOR USE WITH A ROTARY POWER TOOL

FIELD OF THE INVENTION

The present invention relates generally to hand held power tools and more particularly to adhesive dispensing tools powered by hand held power tools.

BACKGROUND OF THE INVENTION

Caulking guns or adhesive dispensing tools are well known in the art and are used often by construction workers for dispensing disposable tubes of adhesive materials such as caulk, sealant, tar and the like. There are known hand powered or manually powered caulking guns for extruding material from adhesive tubes. However, due to the frequent nature at which construction workers use caulk and/or other adhesive materials, manually powering a caulking gun is a rather arduous task. This is particularly true in colder weather when caulk and other adhesive materials become more viscous and therefore more difficult to extrude. Frequent manual operation of a hand powered caulking gun can cause hand and muscle discomfort to the user, which in turn can result in less efficient work.

There are known attempts at providing motorized caulking guns that can eliminate much of the manual labor needed to manually power the caulk gun. As far as cost and practicability are concerned, it is desirable that the motorized caulking gun be powered by commonly used detachable power tool, such as an electric drill for example. In most prior attempts, the motorized caulking guns have a drive mechanism which is powered by a rotary power tool. The drive mechanism often carries a drive plate to drive the plunger in a disposable tube of caulk.

However, a particular problem associated with prior art motorized caulking guns is that they are not easy to use on roof and floor type surfaces. Motorized caulk guns typically have a very short length or require a form of manual manipulation which requires the user to bend over or squat to apply adhesive material to floor or roof surfaces. This often causes discomfort to the backs and legs of construction workers who apply material to floor or roof surfaces. Such discomfort can often slow down the speed at which workers work and lead to work related injuries. The short length of these caulking guns also makes it hard to reach distant caulking surfaces, such as for sealing elevated sides of glass or plastic windows.

Another problem associated with some prior motorized caulking guns is that it is difficult to manipulate the caulk gun for fast application of adhesive material. For example in U.S. Pat. No. 5,027,984 to Gakhar, there is disclosed a caulking gun which is driven by an electric screwdriver. However, operation of the motorized caulking gun in Gakhar would appear to require both hands to be continuously and firmly holding the tool with one hand on the power tool and the other hand on the caulk receptacle to direct and prevent rotation of the caulk tube. This manipulation would also appear to cause workers to excessively bend and squat when dispensing material along floor or roof surfaces.

There are also known attempts at providing motorized adhesive dispensing tools which use detachable drills as exemplified by U.S. Pat. Nos. 3,997,084 to Davis Jr., 4,260,076 to Bergman and 4,322,022 to Bergman. These above mentioned patented devices align the drill in a plane parallel to the caulk receptacle which provides an overall shorter length caulking gun, which as was mentioned causes difficulties when applying material to floor and roof type surfaces. By mounting the drill in a plane offset from the receptacle, the drive mechanisms of these patented devices also require complex gears and the like to drive the pusher plate through the receptacle. The use of multiple gears and the like creates undue complexity and cost.

SUMMARY OF THE INVENTION

In view of the foregoing, it is a general aim of the present invention to provide an adhesive dispensing tool which overcomes many of these and other problems existing in the art.

It is another general aim of the present invention to provide an adhesive dispensing tool that is easy to manipulate for fast application of adhesive material.

It is another general aim of the present invention to provide a low cost adhesive dispensing tool that can be powered by a detachable electric drill.

It is an object of the present invention to provide an adhesive dispensing tool that allows easier and less strenuous application of adhesive material to floor and roof type surfaces.

It is another object of the present invention to reduce the parts necessary for a practical and reliable adhesive dispensing tool.

It is another object of the present invention to provide for a longer length adhesive dispensing tool.

It is therefore a feature of the present invention to provide an adhesive dispensing tool that comprises a caulk receptacle for holding a tube of caulk in a dispensing position and a simplified expandable drive mechanism. The drive mechanism includes two elongate threaded drive members that are juxtaposed to each other with the threads of the drive members interfitting. A first drive member is connectable to a rotary power tool to receive rotary power. A second drive member carries a pusher plate through a drive receiving end of the caulk receptacle. Rotation of the first drive member linearly translates the second drive member to drive the pusher plate through the caulk receptacle.

It is another feature that the present invention provides a drive housing that has a first end connected to the caulk receptacle and a second end for receiving a detachable drill. The drive housing houses the drive mechanism and sets a desired distance between the caulk receptacle and a detachable drill. According to a preferred embodiment, the drill receiving end of the housing is aligned substantially coaxial with the caulk receptacle to provide for the desired distance. It is an advantage of the present invention that the drive housing extends the length of the adapter tool. This features makes the caulk gun easy to manipulate and less strenuous to use when applying adhesive material to floor and roof type surfaces. The feature also makes it easier to apply adhesive material to surfaces which require a long reach.

It is another related feature of the present invention to provide means for mounting a detachable drill at the drill receiving end of the housing. According to a preferred embodiment, the mounting means includes an annular bracket which is adjustably connected to mounting tabs provided on the housing at the drill receiving end.

It is an aspect of the present invention that the drive shaft mechanism is provided for by a threaded drive shaft that interfits with the inner surface of a threaded receiving sleeve. According to a preferred embodiment, the drive shaft includes a chuckable end that connects readily to the chuck of a detachable rotary drill. The sleeve carries a pusher plate at its end for engaging a tube of caulk.

It is another feature of the present invention to provide a handle on the drive housing that provides easier manipulation of the tool by workers. The handle may be retractable and selectively positionable. The handle allows workers to more easily position the adhesive dispensing tool for faster application of adhesive material.

It is another feature of the present invention that the caulk receptacle includes at least one wheel mounted for rotation at the dispensing end of the caulk receptacle. The wheel allows a worker to more easily manipulate and roll the tool against floor and roof type surfaces.

These and other objects and advantages of the invention will become more apparent from the following detailed description when taken in conjunction with the accompanying drawings.

Figure 1:
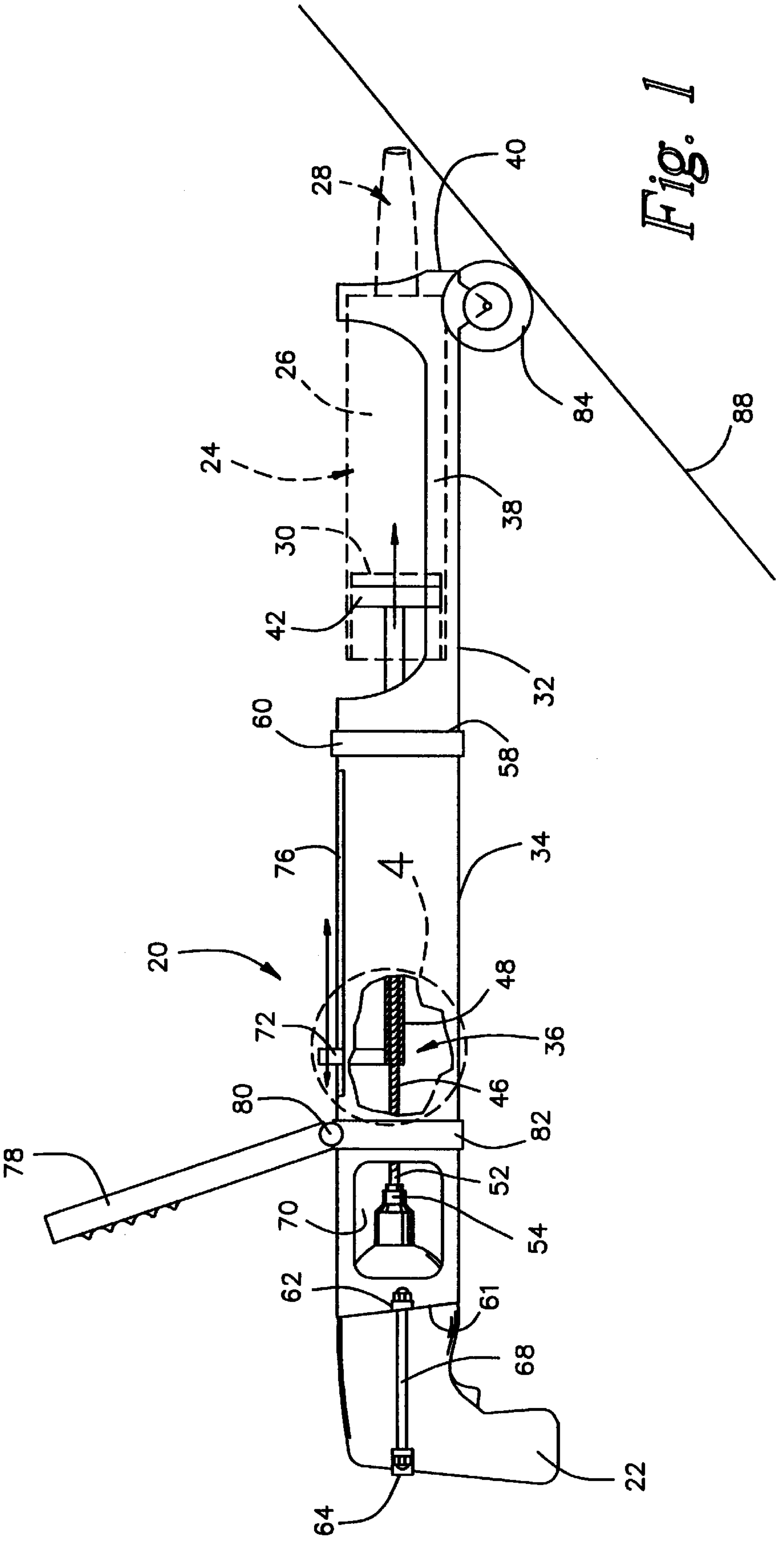
FIG. 1 is a perspective and cut away side view of a adhesive dispensing tool according to a preferred embodiment of the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

For purposes of illustration and referring to FIG. 1, there is seen a preferred embodiment of the present invention exemplified as a caulk gun or an adhesive dispensing tool 20 adapted to be powered by a detachable electric rotary drill 22 or other appropriate rotary power means. As will be explained, the adhesive dispensing tool 20 generally utilizes the rotary power of the drill 22 to extrude and dispense caulk material from disposable caulk tubes 24 and other such tubes of extrudable adhesive materials such as sealant, tar and the like. For purposes of understanding the present invention, an exemplary disposable caulk tube 24 for use with a preferred embodiment is illustrated by broken lines FIG. 1. As may be seen, the exemplary caulk tube 24 includes a cylinder 26 for holding caulk material, a nozzle end 28 coupled with the cylinder 26 for dispensing material, and a plunger 30 closely fitted and axially translatable in the cylinder 28 for urging the material through the caulk tube 24. It will be appreciated that caulk tubes come in several different sizes, such as 11 ounce and 28 ounce tubes, and the preferred embodiment can be constructed to accommodate the desired size.

Turning now in more detail to a preferred embodiment of the present invention, the adhesive dispensing tool 20 generally includes a caulk receptacle portion 32, a drive housing portion 34, and a drive mechanism portion 36. The caulk receptacle 32 includes an elongate channel shaped sidewall 38 and a disc shaped end cap 40 fixed perpendicularly to the sidewall 38 to provide a dispensing end for the tool 20. At the end opposite the end cap 40, the sidewall forms a cylindrical threaded connection end 58.

Figure 2:
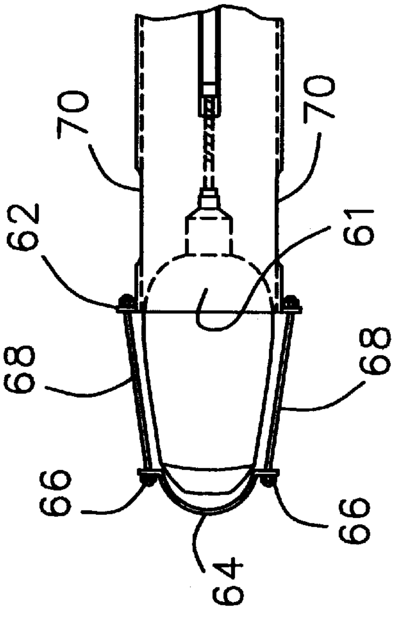
FIG. 2 is a fragmentary top view of an aspect of the embodiment illustrated in FIG. 1.

The drive housing 34 generally has the shape of a cylindrical tube and provides an enlarged threaded collar 60 that is fastened over the threaded connection end 58 of the receptacle 32. Running along a portion of the housing 34, there is cut out a horizontally extending slot 76. The drive housing 34 extends linearly from the axial axis of the receptacle 32 to form an open cylindrical drill receiving end 61 for receiving the drill 22. Near the drill receiving end 61, the housing 34 defines a pair of access orifices 70. A pair of mounting tabs 62 are connected to the housing 34 at the drill receiving end 61 and can be fastened to an annular shaped bracket 64 by a pair of bolts 68 and nuts 62 (See FIG. 2).

The drive housing 34 contains the drive mechanism 36 therein. The drive mechanism 36, whose components are preferably made form film or solid materials such as metal for durability purposes, includes a threaded sleeve 48 and a threaded shaft 46 interfitting with the sleeve 48. The threaded shaft 48 extends toward the drill receiving end 61 and forms a chuckable end 52 suitable for attachment to a chuck 54 of the drill 22. The sleeve extends horizontally into the caulk receptacle 32 and carries a pusher plate 42 therein. The sleeve 32 also provides a finger-like position indicator 72 extending radially outward therefrom. The position indicator 72 is fitted through the slot 76 in the drive housing 34.

Figure 4:
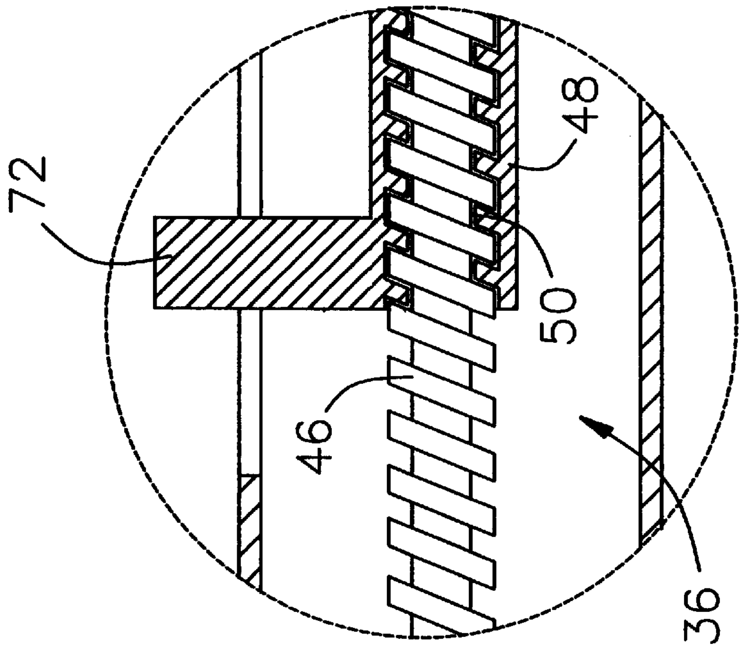
FIG. 4 is an exploded cross sectional view of an aspect of the embodiment illustrated in FIG. 1, taken about circle 4.

In accordance with the aims, objectives and features of the present invention, a preferred embodiment provides the simplified expandable drive mechanism 36. The drive mechanism 36 comprises two juxtaposed threaded drive members, in this case an elongated threaded screw shaft 46 and an elongated sleeve 48 interfitted over the screw shaft 46. As shown best in FIG. 4, the inner surface 50 of the sleeve 48 is threaded and receives the threads of the screw shaft 46 so that the length of the drive mechanism 36 is expandable and retractable. In a preferred embodiment, the sleeve 48 extends into the caulk receptacle 32 to drive the pusher plate 42 through the caulk receptacle 32 while the screw shaft provides the chuckable end 52 for attachment to the drill 22. However, it will be appreciated to those skilled in the art that in an alternative embodiment, a sleeve may connect to the drill while a shaft may carry a pusher plate.

To receive rotary power, the screw shaft 46 includes the chuckable end 52 for attachment to the drill 22. As exemplified in FIG. 1, the drill 22, which is illustrated as being used with the adhesive dispensing tool 20, generally has a common chuck 54 that grips the chuckable end 52 to transfers rotary movement to the shaft 46. Although a detachable drill 22 is preferred for practicability and cost reasons, the present invention may also be practiced with a dedicated drill or other form of rotary power tool, the application of which is hereby reserved.

In accordance with other aims, objectives and features of the present invention, the drive housing 34 generally sets a desired axial distance between the drill 22 and the receptacle 32. This makes it easier to dispense adhesive materials to floor and roof type surfaces. In a preferred embodiment of FIG. 1, the threaded collar 60 and threads 58 provide a rigid substantially coaxial connection between the caulk receptacle 32 and the housing 34 which also allows the caulk receptacle 32 to be detached from the housing 34. This detachable connection allows the user to break down the tool 20 for access to the drive mechanism 36 for maintenance or other purposes. Although two separate detachable components provide for the housing 36 and the caulk receptacle 32 in a preferred embodiment of FIG. 1, it will be understood that these two components may also be formed of one unitary member or may be connected by any other suitable means, the application of which is hereby reserved.

The drill receiving end 61 of the housing 34 readily receives the exemplary electric drill 22 so that the drive mechanism 36 can be attached and detached with the drill 22. The two access orifices 70 in the housing 34 provide access for tightening and loosening the chuck 54 from the drive mechanism 36. At the drill receiving end and referring now to FIGS. 1 and 2, the housing 34 provides the mounting tabs 62 that couple with the annular shaped bracket 64 to hold the detachable electric drill 22 therebetween. The bracket 64 is adjustably fastened to the tabs 62 by a pair of nuts 66 and bolts 68 and provide means for mounting the drill 22 to the housing 34. The annular shape of the bracket 64 generally cradles the drill 22 against the housing 34 and prevents axial translation and rotationally movement between the housing 34 and the drill 22. Due to the adjustable spaced relationship between the bracket 64 and the drill receiving end 61, several different sizes of drills can be used with the preferred embodiment. After securing the drill 22 between the bracket 64 and the housing 34, the drill 22, the housing 34 and the receptacle 32 become firmly fixed so that the tool 20 is easy to manipulate and can be operated with one hand gripping the drill 22.

Before turning to the operation of the tool 20, more attention will be given to the caulk receptacle 32 which holds disposable tubes of caulk 24. The channel shaped sidewall wall 38 of the receptacle 32 cradles the length of the disposable caulk tube 24 in a dispensing position. As may be seen in FIG. 1, the exemplified caulk tube 24 is generally interposed between the pusher plate 42 of the drive mechanism 36 and the end cap 40. The pusher plate 42 contacts the plunger 30 in the caulk tube 24 to urge the caulk tube against the end cap 40. The end cap 40 retains the caulk tube against the force of the expandable drive mechanism 36. It will be appreciated to those skilled in the art that the connection end 58 of the receptacle may also be partially enclosed to provide a bushing (not shown) sized slightly larger than the sleeve 48 and coaxial with the sleeve 48 for smoothly guiding sleeve 48 into the receptacle 32.

In operation, the screw shaft 46 is rotated by the drill 22 to linearly translate the sleeve 48 towards the caulk receptacle 32. More specifically, the threads of the screw shaft 46 engage the inner threads 50 of the sleeve 48 to change rotary power into linear movement. To prevent rotation of the sleeve 48, the sleeve has the finger-like position indicator 72 that extends radially outward from the sleeve 48. The position indicator 72 may engage the housing 34 to prevent rotational slippage of the sleeve 48. It will be appreciated to those of skill in the art that other methods and structures may also be used to prevent slippage such as providing gripping teeth on the pusher plate 42 or providing other means such as a keyed sleeve and bushing. An advantage of the position indicator 72 is that it also provides visual feedback to the user to indicate how much caulk material is left in the caulk tube 24. The position indicator 72 may be integrally formed with the sleeve or may also be a separate component coupled to the sleeve. To dispense material from the caulk tube 24 the drill 22 is activated to rotate the shaft 46 and drive the sleeve 48 and pusher plate 42 into the caulk tube 24. The pusher plate 42 urges the plunger 30 towards the nozzle 28 to cause extrusion of caulk material therefrom.

Figure 3:
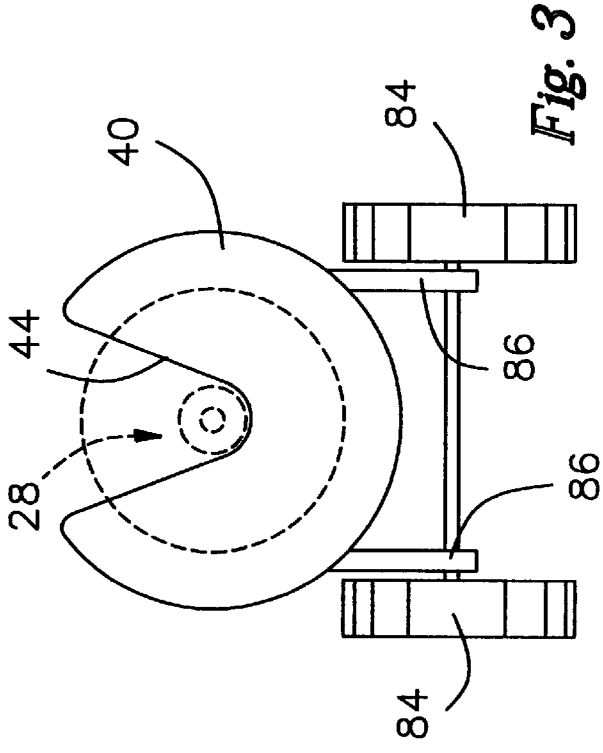
FIG. 3 is a front end view of the embodiment illustrated in FIG. 1.

At this point it should be noted that the drill 22 is preferably a detachable two directional rotational drill with both forward and reverse gears so that the drive mechanism can be easily expanded or retracted as desired. Such reversible drills are now common power tools for most construction workers. The additional reverse direction allows for easier removal of an expended caulk tube and insertion of a new caulk tube. To insert a new caulk tube 24 into an empty receptacle, the drive mechanism 36 is retracted sufficiently so that the tube 24 can be easily inserted into the receptacle 30. The caulk receptacle 32 is of channel shape so that caulk tubes 24 can easily be inserted into and lifted out of the receptacle 32. To accommodate insertion of the nozzle 28 portion, the end cap includes a U-shaped slot 44 as shown in FIG. 3. To retain the caulk tube 24 in the receptacle 32, the drive mechanism 36 is advanced so that the pusher plate 42 enters the tube cylinder 26 and contacts the plunger 30. To remove a caulk tube 24, the drive mechanism 36 is retracted so that the pusher plate 42 exits the tube cylinder 26. With the pusher plate out of the cylinder 26, the caulk tube 24 can easily be lifted out of the receptacle 32.

In accordance with a feature of the present invention, a preferred embodiment provides a retractable handle 78 for easier manipulation of the adhesive dispensing tool 20. This feature makes it easier to manipulate the length of the adhesive dispensing tool 20. The retractable handle 78 is frictionally coupled by a pin 80 to a neck band 82. The neck band 82 is fitted tightly around the housing 34 so that handle 78 provides a good gripping device. However, the neck band 82 is not rigidly fixed with the housing 34 with the housing 34 and may be fitted in an outer groove in the housing so that the handle 78 can be rotated about the housing 34 to a selected angular position as desired.

In accordance with another feature, a preferred embodiment provides a pair of wheels 84 mounted for rotation relative to the caulk receptacle 32. The wheels are mounted to a frame 86 that is rigidly fixed to the dispensing end of the caulk receptacle 32. The wheels 84 stick out just past the caulk receptacle 32 to allow a user to linearly roll the adhesive dispensing tool 20 against floor or roof type surface as indicated by caulking surface 88 in FIG. 1. Although two wheels are shown in the preferred embodiment it will be appreciated that other surface positioning means for positioning the receptacle relative to the caulking surface 88 may also be used such as a single wheel caster or a rounded pin that extends forwardly and below the caulk receptacle.

While herein is shown an embodiment of the present invention, it will be understood that the illustrated embodiments are susceptible of various modifications, alternative constructions and equivalents without departing from the spirit and scope of the invention as defined by the appended claims.

What is claimed is:

1. An adhesive dispensing tool adapted for use with a detachable rotary power tool, comprising;

a receptacle adapted to hold a tube of adhesive material in a dispensing position, the receptacle having a dispensing end and a drive receiving end;

an expandable and retractable drive mechanism having a variable length comprising a first threaded elongate drive member having a chuckable end selectively connectable to the rotary power tool and a second threaded elongate drive member carrying a drive plate into the drive receiving end of the receptacle, the first drive member juxtaposed to second drive member with threads of the second threaded drive member interfitting with the threads of the first drive member, the second drive member being linearly translatable by rotation of the first drive member; and a drive housing containing the drive mechanism therein, the drive housing having a first end connected to the drive receiving end of the receptacle and a second end adapted to selectively receive the rotary power tool, the distance between the first and second ends being fixed during expansion and retraction of the drive mechanism.

2. The adhesive dispensing tool of claim 1 further comprising means for mounting the rotary power tool to the second end of the drive housing.

3. The adhesive dispensing tool of claim 2 wherein the second end of the drive housing is substantially coaxial with the receptacle.

4. The adhesive dispensing tool of claim 2 further comprising a bracket adjustably connected to the drive housing to provide said mounting means.

5. The adhesive dispensing tool of claim 4 wherein the housing defines an access orifice in close proximity to the second end of the drive housing, the access orifice being sized to provide user access for connecting and disconnecting the-rotary power tool with the first drive member.

6. The adhesive dispensing tool of claim 1 further comprising a grippable handle connected to the drive housing, the handle extending radially outward from the drive housing.

7. The adhesive dispensing tool of claim 1 further comprising at least one wheel rotatably mounted at the dispensing end of the receptacle.

8. The adhesive dispensing tool of claim 1 wherein the drive mechanism further comprises means for preventing the rotation of the second drive member.

9. The adhesive dispensing tool of claim 1 wherein the drive mechanism comprises a sleeve defining a threaded inner surface and a screw shaft interfitting with the inner surface of said sleeve, a combination of the screw shaft and the sleeve having a variable length, the sleeve and the screw shaft providing for the first and second drive members.

10. An adhesive dispensing tool adapted to be used with a detachable rotary power tool that has a chuck for gripping a shaft, comprising:

a receptacle adapted to hold a tube of adhesive material in a dispensing position, the receptacle having a dispensing end and a drive receiving end, a housing having a first end connected to the drive receiving end of the receptacle and a second end adapted to selectively receive the rotary power tool the second end being fixed relative to the receptacle;

an extendible and retractable drive mechanism contained in the housing, the drive mechanism comprising a drive sleeve having a threaded inside surface and a threaded drive shaft interfitted with the threads of the drive sleeve, the drive mechanism having a chuckable end adapted to connect the chuck of the rotary power tool and a drive end carrying a drive plate into the drive receiving end of the receptacle, the distance between the chuckable end and the drive end being variable, whereby rotation applied to the chuckable end linearly drives the drive plate and the distance between the dispensing end and second end of the housing being fixed during expansion and retraction of the drive mechanism.

11. The adhesive dispensing tool of claim 10 further comprising a bracket connected to the second end of the housing, the bracket adapted to removably mount the rotary power tool to the second end of the housing.

12. The adhesive dispensing tool of claim 10 wherein the housing defines a slot having a length that extends over a portion of the housing between said first and second ends, and wherein the drive sleeve is linearly translated by rotation applied to the chuckable end the drive sleeve having a finger extending radially outward therefrom and extending through the slot in the housing for indicating the position of the sleeve.

13. The adhesive dispensing tool of claim 10 wherein the second end is substantially coaxial with the drive receiving end.

14. The adhesive dispensing tool of claim 10 further comprising a retractable handle extending radially from the outer periphery of the drive housing, the retractable handle being coupled to a band, the band being closely fitted around the housing and being rotatable about the drive housing.

15. The adhesive dispensing tool of claim 10 further comprising surface positioning means, coupled to the receptacle at the dispensing end, for positioning the receptacle with respect to a surface for receiving adhesive material.

16. The adhesive dispensing tool of claim 15 wherein said surface positioning means comprises at least one wheel rotatably mounted to the dispensing end of the receptacle.

17. The adhesive dispensing tool of claim 10 wherein the drive mechanism is expandable and has a variable length.

18. An adhesive dispensing tool adapted to use a detachable rotary power tool that has a chuck for gripping a shaft, the adhesive dispensing tool comprising:

a receptacle for holding a tube of adhesive material in a dispensing position, the receptacle having a dispensing end and a drive receiving end, a cylindrical housing having a first end connectable with the drive receiving end of the receptacle and a second end adapted to receive the rotary power tool, the housing defining an access orifice near the second end of the drive housing for permitting access to the chuck of the rotary power tool the second end being fixed relative to the receptacle, the housing defining a slot having a length that runs along the axial axis of the cylindrical housing;

means for mounting the rotary power tool to the second end of the housing;

an elongate drive shaft housed inside the housing and having a chuckable end for selective connection to the chuck of the rotary power tool to receive rotary movement therefrom, the drive shaft being threaded;

a elongate drive sleeve carrying a drive plate that extends into the drive receiving end of the receptacle for engaging a tube of adhesive material, the inside surface of the drive sleeve being threaded and interfitted with the threads of the drive shaft whereby rotation of the drive shaft translates the drive sleeve in a linear fashion, the drive sleeve including a finger extending radially outward therefrom, the finger fitting through the slot of the housing for preventing rotation of the sleeve and indicating the position of the sleeve, the combination of the drive sleeve and the drive shaft providing an extendible and retractable drive mechanism having a variable length, the distance between the dispensing end and second end being fixed during expansion and retraction of the drive mechanism.

19. The adhesive dispensing tool of claim 18 further comprising a handle extending radially outward from the outer periphery of the drive housing.

20. The adhesive dispensing tool of claim 19 further comprising at least one wheel being rotatably mounted at the dispensing end of the receptacle.

* * * * *